(12) United States Patent
Giannazzo et al.

(10) Patent No.: US 11,559,961 B2
(45) Date of Patent: Jan. 24, 2023

(54) PRESSING EQUIPMENT, A PLANT AND A METHOD FOR FORMING A FLOOR ELEMENT

(71) Applicant: Daltile Corporation, Dallas, TX (US)

(72) Inventors: Felipe Giannazzo, Dallas, TX (US); Claudio Caselli, Dallas, TX (US); Rahul Patki, Richardson, TX (US)

(73) Assignee: Daltile Corporation, Dallas, TX (US)

( * ) Notice: Subject to any disclaimer, the term of this patent is extended or adjusted under 35 U.S.C. 154(b) by 615 days.

(21) Appl. No.: 16/572,944

(22) Filed: Sep. 17, 2019

(65) Prior Publication Data
US 2021/0078279 A1 Mar. 18, 2021

(51) Int. Cl.
*B30B 15/30* (2006.01)
*B30B 9/28* (2006.01)
*B32B 38/18* (2006.01)
*E04F 15/02* (2006.01)
*E04F 15/08* (2006.01)

(52) U.S. Cl.
CPC .............. *B30B 15/30* (2013.01); *B30B 9/28* (2013.01); *B32B 38/1833* (2013.01); *E04F 15/02038* (2013.01); *E04F 15/087* (2013.01); *E04F 2201/023* (2013.01); *E04F 2201/043* (2013.01)

(58) Field of Classification Search
CPC ..... B30B 15/30; B30B 9/241; B32B 38/1833; B32B 38/1841; B29C 2043/483
USPC .......................................................... 156/580
See application file for complete search history.

(56) References Cited

U.S. PATENT DOCUMENTS

| | | | |
|---|---|---|---|
| 3,521,418 A | 7/1970 | Lawrence |
| 3,646,180 A | 2/1972 | Winnick |
| 3,817,012 A | 6/1974 | Clark et al. |
| 4,415,616 A | 11/1983 | Angioletti |
| 4,567,704 A | 2/1986 | Bernett |
| 4,621,001 A | 11/1986 | Bard |
| 4,681,786 A | 7/1987 | Brown |
| 4,717,695 A | 1/1988 | Oda |
| 4,832,995 A | 5/1989 | McLauchlin |

(Continued)

FOREIGN PATENT DOCUMENTS

| | | |
|---|---|---|
| CN | 106743519 A | 5/2017 |
| EP | 2369090 B1 | 9/2011 |

(Continued)

OTHER PUBLICATIONS

Oprea, "Effects of Fillers on Polyurethane Resin-based Polyurethane Elastomeric Bearing Materials for Passive Isolation," Journal of Composite Materials 2008 42:2673.

(Continued)

*Primary Examiner* — Scott W Dodds
(74) *Attorney, Agent, or Firm* — Troutman Pepper Hamilton Sanders LLP; James E. Schutz; Chris N. Davis

(57) ABSTRACT

The invention is directed to a pressing equipment for manufacturing a floor element, wherein the pressing equipment comprises a press configured to press an upper decorative layer of the floor element upon a lower support layer of the floor element, a positioning device configured to place the floor element in a pressing position at the press, and a centering device configured to adjust the mutual position of the upper decorative layer of the floor element and of the lower support layer of the floor element.

13 Claims, 5 Drawing Sheets

(56) References Cited

U.S. PATENT DOCUMENTS

| | | | |
|---|---|---|---|
| 5,037,498 A * | 8/1991 | Umeda | B32B 37/10 |
| | | | 428/116 |
| 5,199,692 A * | 4/1993 | Kimura | B25B 5/00 |
| | | | 269/61 |
| 5,916,398 A * | 6/1999 | Coleman | B29D 11/0073 |
| | | | 156/275.5 |
| 5,937,612 A | 8/1999 | Winer et al. | |
| 6,413,618 B1 | 7/2002 | Parker et al. | |
| 6,818,275 B2 | 11/2004 | Guarda et al. | |
| 7,393,583 B1 | 7/2008 | Warren | |
| 7,984,660 B2 | 7/2011 | Nathan et al. | |
| 7,993,731 B2 | 8/2011 | Miller et al. | |
| 9,896,581 B2 | 2/2018 | Morizur | |
| 2003/0098117 A1 * | 5/2003 | Vaders | B27N 3/08 |
| | | | 156/581 |
| 2004/0031225 A1 | 2/2004 | Fowler | |
| 2004/0031226 A1 | 2/2004 | Miller et al. | |
| 2004/0255541 A1 | 12/2004 | Theirs et al. | |
| 2006/0111002 A1 | 5/2006 | Rodrigues | |
| 2007/0051063 A1 | 3/2007 | Sabater et al. | |
| 2007/0220822 A1 | 9/2007 | Permesang | |
| 2007/0289236 A1 | 12/2007 | Choi | |
| 2009/0041987 A1 | 2/2009 | Schitter | |
| 2009/0155612 A1 | 6/2009 | Pervan et al. | |
| 2010/0018149 A1 | 1/2010 | Theirs | |
| 2010/0146895 A1 | 6/2010 | Dempsey et al. | |
| 2010/0154339 A1 | 6/2010 | Boyadjian et al. | |
| 2010/0022948 A1 | 9/2010 | Wallin | |
| 2011/0041989 A1 | 2/2011 | Anspach et al. | |
| 2011/0239572 A1 | 10/2011 | Calapkulu | |
| 2011/0302855 A1 | 12/2011 | D'Agostino | |
| 2012/0100332 A1 | 4/2012 | Yu et al. | |
| 2012/0317911 A1 | 12/2012 | Huang | |
| 2013/0014891 A1 | 1/2013 | Vandevoorde et al. | |
| 2013/0097950 A1 | 4/2013 | Hunsaker et al. | |
| 2013/0104485 A1 | 5/2013 | Meersseman et al. | |
| 2015/0121793 A1 | 5/2015 | Segaert et al. | |
| 2016/0288447 A1 | 10/2016 | Cordeiro | |
| 2016/0303868 A1 | 10/2016 | Hansson et al. | |
| 2017/0072672 A1 * | 3/2017 | Cossins | E06B 3/822 |
| 2018/0127987 A1 | 5/2018 | Bradway et al. | |
| 2018/0195291 A1 | 7/2018 | Loncke et al. | |
| 2018/0258651 A1 | 9/2018 | Meersseman et al. | |
| 2020/0141130 A1 | 5/2020 | Patki et al. | |

FOREIGN PATENT DOCUMENTS

| | | |
|---|---|---|
| EP | 3130464 A1 | 2/2017 |
| EP | 3404165 A1 | 11/2018 |
| JP | 2012026260 A | 2/2012 |
| KR | 20110064350 A | 6/2011 |
| WO | 2009142365 A | 11/2009 |
| WO | 2010072704 A1 | 7/2010 |
| WO | 2011150076 A1 | 12/2011 |
| WO | 2017013501 | 1/2017 |

OTHER PUBLICATIONS

Gil, "Cork Composites: A Review," Materials Sep. 2009; 2(3): 776-789.

Machine translation of EP 3130464, 12 pages.

International Search Report and Written Opinion for International Application No. PCT/US2020/050615 dated Dec. 18, 2020.

* cited by examiner

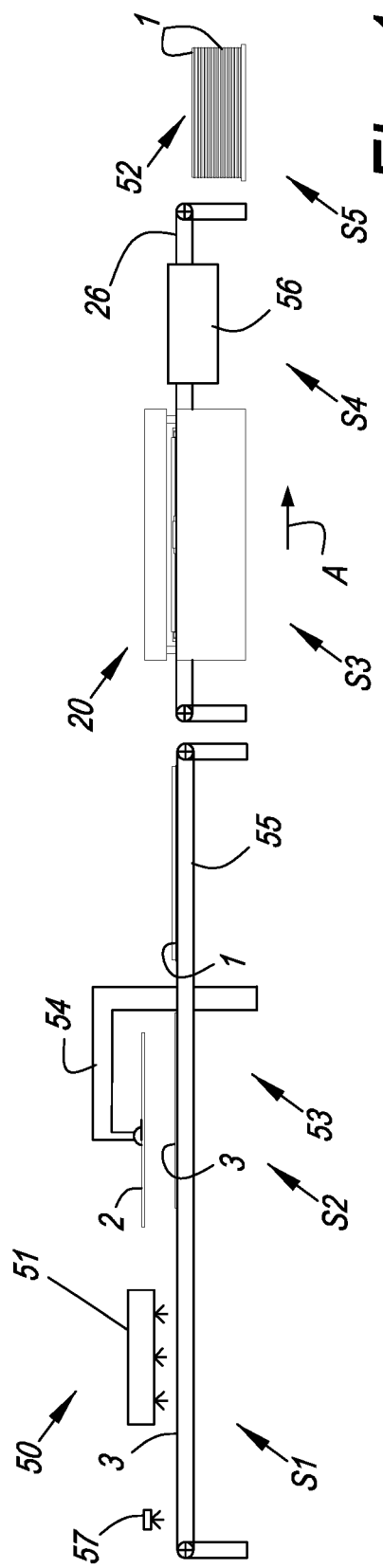

US 11,559,961 B2

PRESSING EQUIPMENT, A PLANT AND A METHOD FOR FORMING A FLOOR ELEMENT

BACKGROUND

1. Technical Field

The present invention relates to a pressing equipment for forming a floor element. In particular the present invention relates to a pressing equipment for forming a floor element comprising an upper decorative element, e.g. a ceramic tile or a natural stone, and a lower support element, for example a support element comprising a polymeric material like an LVT or SPC board. The invention also relates to a plant and a method for manufacturing a floor element.

2. Background

U.S. Pat. No. 7,984,600 B2 discloses an equipment and a method for forming a groutless tile comprising a ceramic tile and a supporting substrate. The floor element is manufactured by placing a ceramic tile into a mold and then injecting a polymeric substance, forming the substrate, into the mold so that the substrate is formed directly onto the ceramic tile. Although this method is fast and efficient it requires expensive molds designed on the basis of the specific product to be manufactured, and in particular on the dimension thereof. Moreover, this method is suitable to be used for manufacturing only substrates made with material that can be injection molded. It is also to be noted that the method disclosed in U.S. Pat. No. 7,984,600 is for the manufacture of floor elements having a substrate comprising coupling elements that must be machined after the injection molding step. Therefore, during the machining step the machining tool can contact the ceramic tile, thereby being damaged.

EP 3 130 464 A1 discloses an equipment and a method for forming a floor element comprising a stone tile and a supporting polymeric substrate. The method provides for spreading a granulated thermoplastic material on a belt, pre-compacting the thermoplastic material to form a web shaped soft layer, placing the stone tile on said web shaped soft layer and then hot pressing the stone tile and the web shaped soft layer to form the floor elements. The product web shaped material has to be cut in order to separate the floor elements after the hot-pressing step. Moreover, in case coupling elements are needed, these must be manufactured in a separate machining step on the floor element having the stone tile, similarly to the method of U.S. Pat. No. 7,984,600. This method is suitable to be used only for manufacturing substrates starting from thermoplastic granular materials.

The present invention aims in the first place to provide an alternative pressing equipment and method for manufacturing floor tile, which, in accordance with several of its preferred embodiments, is directed to solve one or more of the problems arising in the state of the art.

BRIEF SUMMARY OF THE INVENTION

In one aspect, the present invention provides a pressing equipment for manufacturing a floor element, the pressing equipment comprising a press for pressing an upper decorative layer of the floor element on a lower support layer of the floor element; a positioning device for placing one or both of the lower support layer and the upper decorative layer in a pressing position on the press; and a centering device for adjusting the position of both of the upper decorative layer and of the lower support layer.

In another aspect, the present invention provides a pressing equipment for manufacturing a floor element, the pressing equipment comprising a press; a carrier to move the floor element along an advancing direction during pressing; and a centering element to keep the mutual position between an upper decorative layer of the floor element and a lower support layer of the floor element during pressing.

In another aspect, the present invention provides a plant for manufacturing a floor element, the plant comprising a pressing equipment for pressing together an upper decorative layer of the floor element and a lower support layer of the floor element; and a gluing device configured to provide a glue on a surface of one or both of the upper decorative layer and/or the lower support layer, wherein the gluing device is upstream of the pressing equipment.

These and other objects, features and advantages of the present invention will become more apparent upon reading the following specification in conjunction with the accompanying description, claims and drawings.

BRIEF DESCRIPTION OF THE FIGURES

The accompanying Figures, which are incorporated in and constitute a part of this specification, illustrate several aspects described below.

FIG. 12 shows in a schematic view a plant for manufacturing a floor element.

DETAILED DESCRIPTION OF THE INVENTION

Figure 1:
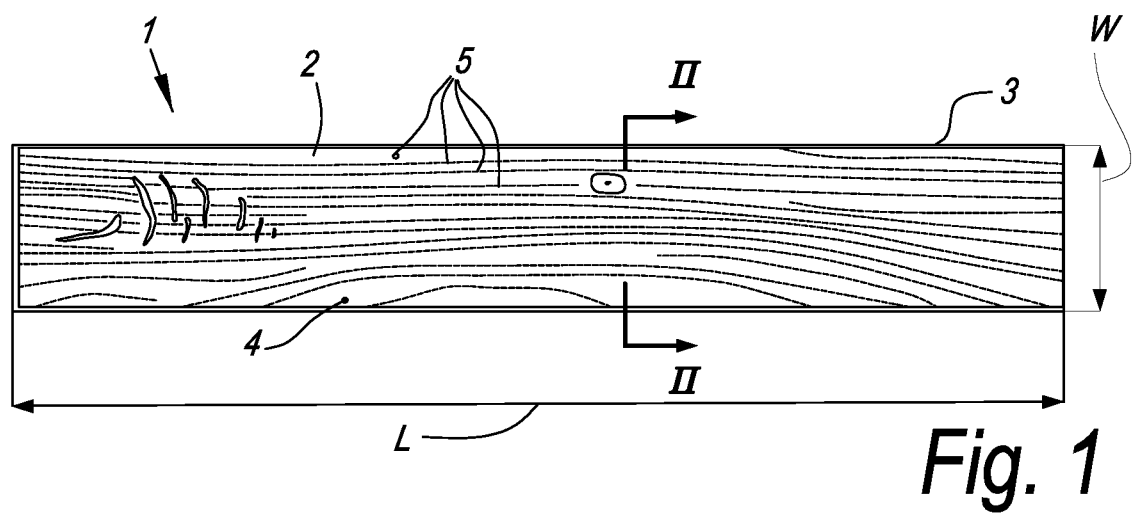
FIG. 1 shows a top plane view of a floor element.

Thereto, the present invention, according to a first independent aspect, relates to a pressing equipment for manufacturing a floor element, wherein the floor element comprises an upper decorative layer and a lower support layer, wherein the equipment comprises: a press for pressing the upper decorative layer upon the lower support layer, a positioning device for placing at least one between said layers in a pressing position at the pressing element, and a centering device for adjusting the mutual position of the upper decorative layer and of the lower support layer. Therefore, the invention provides an equipment that is able to precisely assemble the different elements of the floor element without the need of further manufacturing steps. Moreover, the invention provides a solution for speeding up said assembling since the centering can be preformed directly at the pressing position without the need of previous intermediate steps.

Preferably the floor element is of the type disclosed in the application U.S. Ser. No. 16/278,560 which is hereby incorporated by reference.

In a preferred embodiment, the upper decorative layer is a ceramic tile. In other embodiments, the upper decorative layer can be made of different materials, preferably hard and/or brittle material, for example, glass, natural stone, cement board, mineral board and/or artificial stone, or metal.

The lower support layer may be made of a synthetic material like polymeric material, or polymer based composite material. For example, the lower support layer can be made of flexible or, preferably, rigid PVC. The PVC lower support layer can preferably comprise one or more fillers like particles and/or fibers. Alternatively, the support layer can be made of mineral materials, or a cement-based material, like fiber cement material. A preferred example of mineral material is magnesium oxide. A preferred example of cement-based material is Portland cement. Mineral boards or cement-based boards can comprise fibers, like cellulose fibers, wood fibers and/or glass fibers.

The floor element preferably further comprises an intermediate layer interposed between the upper decorative layer and the lower support layer. The intermediate layer can be a bonding and/or a reinforcing layer, i.e. it can be configured to bond together the upper and the lower layer and/or to reinforce the upper and/or the lower layer upon mechanical stress like tensile, compressive, torque and/or impact stress. Preferably the intermediate layer can comprise, even better be substantially formed by, a glue and/or a resin. Preferably, the support layer comprises a top surface (the surface facing the decorative layer) that is sanded and/or roughened to improve adhesion of the glue and/or the resin.

According to a preferred embodiment of the invention, the support layer comprises coupling elements configured for forming a mechanical coupling with coupling elements of an adjacent coupling element. Preferably the coupling elements can comprise a male part, for example a tongue, and a female part, for example a groove. Preferably said coupling elements are at least partially provided on the edges of said support layer. The coupling elements may be at least partially covered with a removable lining, for example a polymeric film. Said lining can prevent glue and/or resin to overflow on the coupling elements during pressing. Said eventual overflow could harm the coupling capability of the final product. The linings can be removed, for example peeled out, after manufacturing of the floor element. In order to prevent glue overflow, in addition or as an alternative to said linings, the support layer and/or the decorative layer can comprise one or more grooves or channels configured to collect an overflowing portion of the glue. Said grooves are preferably parallel to the edges of the decorative layer and/or of the support layer.

Preferably, at least one between the upper layer and the lower support layer comprises edges extending beyond an upper edge and/or a lower edge of the other layer. In certain embodiments, the upper layer and the lower support layer may have different dimensions, in particular on a horizontal plane. For example, the support layer comprises at least one edge extending beyond an upper edge of the upper ceramic layer. In an alternative example, the upper layer can comprise at least one edge extending beyond a lower edge of the support layer. It is also not excluded that in certain embodiments both the upper layer and the support layer comprise some edges extending beyond edges respectively of the upper or lower layer. It is also preferable that on one of said extending edges are provided marks or signs to indicate identify that specific edge of the support layer and/or of the decorative layer, in this way it is possible to identify which edge should be the extending one and place the relative layer with the correct orientation in the pressing equipment. The mark or sign can be an incision and or a bidimensional sign, for example a text, a drawing or a barcode, preferably it is a sign readable with an optical reader.

Within the context of the present application, the terms "lower" and "upper" with reference to the layers of the floor element, shall be interpreted with reference to the relative position of the layers during the use of the floor element itself. Therefore, it is not excluded that the floor element is manufactured upside down, i.e. with the decorative layer in a lower position with respect to the support layer.

In a preferred embodiment, the positioning device is adapted to interact with only one layer selected between the lower support layer and the upper decorative layer. This provides the possibility of positioning one of the layers of the floor element, and then independently adjusting the mutual position of the two layers by means of the centering element according to the product specification. In an alternative embodiment, the positioning device is configured to interact with more than one layer, for example with all the layers of the floor element.

The positioning device is adapted to interact with one or more edges of said layer to be positioned. In particular, the positioning device comprises at least a first couple of contact surfaces adapted to contact opposite edges of the layer to be positioned in the pressing position, i.e. of at least one between the support layer or the ceramic layer. Preferably the positioning device is provided also with a second couple of contact surfaces adapted to contact opposite edges the layer to be positioned. Advantageously the first and the second couple of contact surfaces are transverse to each other, preferably orthogonal to each other. In this way, the layer to be positioned is constrained between the contact surfaces, and the position of the contact surfaces relative to the press substantially defines the pressing position. According to a preferred embodiment, the positioning device is adapted to contact the layer to be positioned without contacting the glue, for example it is positioned in a distal position with respect to the surface to be glued. It is also possible that the positioning device comprises a removable covering or lining to be removed in case the glue contacts the positioning device and dries on it.

In a preferred embodiment, the positioning device comprises at least one movable element adapted to adjust the distance between the contact surface of the couple of contact surfaces. Preferably, said movable element is provided with one contact surface of the couple and is configured to approach or move away from said contact surface to the other contact surface of the couple, preferably in a direction that is substantially orthogonal to the contact surfaces. Preferably, the positioning device comprises at least one movable element for each couple of contact surfaces. It is also possible that the positioning device comprises one movable element for each surface of the couple of surfaces so that the surfaces of the couple can be reciprocally approached and/or moved away. To selectively change the distances between the contact surfaces permits one to adapt the positioning device to the product specification. In fact, the movable elements of the positioning device allow the use of a mold free press that is able to manufacture floor elements of different dimensions and/or with different characteristics without the need of changing the mold. To perform a production change it is sufficient to change the movement condition of the positioning device, so as to change the distances between the contact surfaces, thereby improving the flexibility of the process.

Preferably, the movable element is movable on a plane substantially planar with respect to the plane of the floor element. In a preferred embodiment, the movable element may be movable along a straight line for simple construction of the equipment. In some embodiments of the invention, the movable elements of each couple of contact surfaces may be moved synchronously. According to alternative embodiments, each movable element may be moved independently from the others. For example, the positioning device can comprise an actuator configured to move the movable elements. In a preferred embodiment, the positioning device can comprise one actuator for moving a plurality of, or preferably all of, the movable elements related to each couple of contact surfaces.

The centering device is preferably adapted to interact with only one layer selected between the support layer and the ceramic layer. More preferably, the centering device is adapted to interact with that layer of the floor element that does not interact with the positioning device. This provides the possibility of adjusting the mutual position of the two layers by the centering element according to the product specification. In an alternative embodiment, the centering device is configured to interact with more than one layer, for example with all the layers of the floor element.

Preferably the centering device is adapted to interact with one or more edges of said layer to be centered. In a preferred embodiment, the centering device comprises at least a first couple of abutment surfaces adapted to contact opposite edges of the layer to be centered, i.e. of at least one between the support layer or the ceramic layer. Preferably the centering device is provided also with a second couple of abutment surfaces adapted to contact opposite edges the layer to be positioned. Advantageously the first and the second couple of abutment surfaces are transverse to each other, preferably orthogonal to each other. According to a preferred embodiment, the centering device is adapted to contact the layer to be centered without contacting the glue, for example is positioned in a distal position with respect to the surface to be glued. It is also possible that the centering device comprises a removable covering or lining to be removed in case the glue contacts the centering device and dries on it.

In a preferred embodiment, the centering device comprises at least one movable element adapted to adjust the distance between the abutment surfaces of the couple of abutment surfaces so that once the support layer is positioned in the pressing position the decorative layer may be correctly centered above it. Preferably, said movable element is provided with one abutment surface of the couple and is configured to approach/or move away said contact surface to the other abutment surface of the couple, preferably in a direction that is substantially orthogonal to the abutment surfaces. Preferably, the centering device comprises one movable element for each couple of abutment surfaces. It is also possible that the centering device comprises one movable element for each abutment surface of the couple of abutment surfaces so that the abutment surfaces of the couple can be reciprocally approached and/or moved away. To selectively change the distances between the abutment surfaces permits the centering device to adapt to the product specification. In fact, the movable elements of the centering device allow the use of a mold free press that is able to manufacture floor elements of different dimensions and/or with different characteristics without the need of changing the mold. To perform a production change, it is sufficient to change the movement condition of the abutment device thereby improving the flexibility of the process. Preferably, the movable element is movable on a plane substantially planar with respect to the plane of the floor element.

In a preferred embodiment, the movable element may be movable along a straight line for a simple construction of the equipment. In some embodiments of the invention, the movable elements of each couple of contact surfaces may be moved synchronously. According to alternative embodiments, each movable element may be moved independently from the others. For example, the centering device can comprise an actuator configured to move the movable elements. In a preferred embodiment, the positioning device can comprise one actuator for moving a plurality of, or preferably all of, the movable elements related to each couple of contact surfaces.

Preferably the centering device is disposed above the positioning device. More generally, the centering device is disposed on a plane that is different from the plane of the positioning device.

In a preferred embodiment, the movable elements of the centering device may be movable independently with respect to the movable elements of the positioning device. This independency provides an improved flexibility of the equipment. According to another embodiment, the centering device can be solidly linked to the positioning device, at least during the movement of the positioning device. In this embodiment, the centering device can be mechanically coupled to the positioning device, for example fixed to and/or mounted on the positioning device. For example, in this embodiment, the mutual position of the centering device with respect to the positioning device can be set up before start of operation according to the product specification and then during production the centering device is moved by the positioning device.

In another embodiment at least one of, for example both of, the positioning device and the centering device are fixed and substantially stationary with respect to the pressing position.

In a preferred embodiment, the equipment may comprise a supporting structure provided with a supporting plate upon which the floor element, preferably at least one of the upper decorative layer and the lower support layer, rests to be pressed. Therefore, the pressing position is defined upon this supporting plate. In a preferred embodiment the positioning device and/or the centering device are mounted on this supporting structure. If the positioning device and/or the centering device comprises a movable element, then the movable elements are movable upon said supporting plate.

Preferably, the press comprises one or more pressing element activated by a pneumatic, oleo dynamic, mechanical and/or hydraulic force. In a preferred embodiment, the pressing element comprises a plurality of pistons adapted to press the floor element. Said pistons are adapted to press directly the floor element or indirectly via the interposition of a pressing plate. In a preferred embodiment, the pressing elements are independently controllable and/or controllable in group of pressing elements, so that they can be controlled and/or activated according to the product specification. For example, in manufacturing a larger floor element a larger number of pressing elements can be activated, whereas for manufacturing a smaller floor element a lower number of pressing elements can be activated. Preferably, the press is configured to exert a pressure of at least 350 kg/sqm on the floor element. Preferably, the press is configured to exert a pressure of less than 500 kg/sqm on the floor element. Preferably, the press is configured to keep the pressure exerted on the floor element for a pressing time of at least 1 s.

The press may be realized according to several possibilities, two of which are herein disclosed as non-exhaustive examples.

In a first possibility, the press is a stationary pressing device. Within the context of the present invention, the expression "stationary pressing device" or "stationary press" refers to a press where the floor element stands in a fixed pressing position during the pressing operation. In other words, the pressing position is fixed with respect to the supporting structure. Preferably, in this first possibility the pressing elements comprises at least a piston, preferably a plurality of pistons.

In a second possibility, the press is a continuous pressing device. Within the context of the present invention, the expression "continuous pressing device" or "continuous press" refers to a press where the floor element advances in a predetermined advancing direction during the pressing operation. In other words, the pressing position is movable with respect to the supporting structure. In this second possibility the press comprises a carrier, preferably a belt, adapted to move the floor element along advancing direction. Preferably, according to this second possibility, the press comprises at least a pressing belt and/or at least a pressing roller.

In a preferred version of this second possibility the positioning device and/or the centering device is fixed in a predetermined position with respect to the press and/or the carrier. Preferably, in this preferred version of the second aspect the positioning device and/or the centering device is movable along the advancing direction together with the press and/or the carrier. For example, the positioning device may be fixed to the carrier and the centering device may be fixed to the press, preferably to the belt. In particular, the positioning device may be substantially formed by a containing cavity provided on the press and/or on the carrier, said containing cavity is defined by walls on which said abutment surfaces and/or contact surfaces are provided. Said cavity can be provided in form of excavation or impression made in a surface of the carrier and/or of the pressing belt. Alternatively, the cavity can be defined by ribs rising from a surface of the carrier and/or of the pressing belt. Preferably said ribs are made of polymeric material, preferably of a compressible material.

According to another version of this second possibility, the positioning device and or the centering device comprise one or more movable elements to adjust the distance between the contact surface of a couple and/or the abutment surfaces of a couple respectively. Preferably, said movable elements are at least movable in a direction transversal, preferably substantially perpendicular to the advancing direction of the floor element. Preferably, said contact surfaces and/or said abutment surfaces are substantially parallel to said advancing direction. According to this version the positioning device and/or the centering device can be independent with respect to the movement of the press and of the carrier. In other words, one or both of the positioning device and/or the centering device do not move along the advancing direction.

The pressing equipment may further comprise one or more carriers adapted to transport one or more of the layers of the floor element toward the pressing position and/or transport the floor element away from the pressing position. For example, the carrier can comprise one or more belt and/or robotic arm provided with gripping means. The carrier can be configured to move the layers toward an inlet opening of the supporting structure and/or to transport the floor element away from an outlet opening of the supporting structure. Preferably, said inlet opening and said outlet opening are placed on different sides, for example opposite sides, of the supporting structure. In this second possibility the positioning device and the centering device are configured to respectively keep the position of the floor element in the pressing position during the movement along the advancing direction and keep the mutual position between the upper decorative layer and the lower support layer.

The continuous pressing equipment can comprise means for keeping the mutual position between the upper decorative layer and the lower support layer during pressing, which forms an inventive idea irrespective of other features of the pressing equipment described in relation to the first aspect. Therefore, according to a second independent aspect, the invention relates to a pressing equipment for manufacturing a floor element, wherein the floor element comprises an upper decorative layer and a lower support layer, wherein the equipment comprises: a press, a carrier to move the floor element along an advancing direction during pressing and at least a centering element to keep the mutual position between the upper ceramic element and a lower support element during pressing. The second aspect allows the manufacture of multilayered floor elements without the necessity of further process steps, like cutting or milling, and with the high productivity guaranteed by a continuous press.

The pressing equipment, and in particular the positioning device and/or the centering device, comprises one or more of the features described in relation to the first aspect.

Particularly, in a preferred embodiment of the second aspect, one or both of the positioning device and/or the centering device is fixed in a predetermined position with respect to the press and/or the carrier. Preferably, in this second embodiment of the second aspect the positioning device and/or the centering device is movable along the advancing direction together with the press and/or the carrier. In one embodiment, the positioning device may be fixed to the carrier and the centering device may be fixed to the press, preferably to the belt. In this second embodiment the positioning device may be substantially formed by a containing cavity provided on the press and/or on the carrier, said containing cavity is defined by walls on which said abutment surfaces and/or contact surfaces are provided. Said cavity can be provided in form of excavation or impression made in a surface of the carrier and/or of the pressing belt. Alternatively, the cavity can be defined by ribs rising from a surface of the carrier and/or of the pressing belt. Preferably said ribs are made of polymeric material, preferably of a compressible material.

According to a third independent aspect, the invention relates to a plant for manufacturing a floor element, the plant comprising a pressing equipment for pressing together the upper decorative layer and the lower support layer, the plant further comprises a gluing device configured to provide a glue on a surface of one or both of the decorative layer and/or the lower support layer, said gluing device being disposed upstream to said press. It is to be noted that the fact that the plant comprises a gluing device forms an inventive idea irrespective from the features of the press. According to a preferred embodiment the pressing equipment comprises one or more of the features described in relation to the first and the second independent aspect.

The gluing device is preferably configured to apply a glue in a liquid, viscous and/or pasty state. Although, is not excluded that the glue may be applied in other forms, for example in solid form like in powder form or in sheet form. According to a preferred embodiment, the gluing device comprises a sprayer to spray or to eject the glue from a nozzle. According to an alternative embodiment, the gluing device may comprise a roller or a veil applicator or a bell applicator.

The glue is preferably a resin, even more preferably a thermosetting resin. For example, the thermosetting resin can be epoxy-based, acrylic-based or polyurethane-based. The glue may be a bicomponent resin, in this case the gluing device may comprise a mixing element to mix the two components of the resin, and preferably said mixing means may be configured to mix the two components before and/or during the application of the glue. The mixing element can be a tube having internal fins. The two components of the glue can flow together in the mixing element so that the turbulent flow caused by the fins allow mixing of the components. The mixing element is preferably located close to the nozzle of the gluing device (in case of a sprayer) so that the hardening reaction of the components does not harm the gluing device, for example by clogging the nozzle. If the glue is a bicomponent resin, or a multicomponent resin, the plant may also comprise a plurality of gluing devices, wherein each of said gluing devices may be configured to apply one or more of said components.

If the gluing device comprises a roller, it can comprise means to avoid the resin hardening on the gluing device itself. For example, said means can comprise a removable film covering said roller. In this way, the film can be easily removed and substituted without the need of long and expensive cleaning cycles.

The gluing device can be configured to apply the glue to form a uniform layer and/or according to a predetermined pattern. More preferably, the gluing device is configured to apply the glue in such a way to prevent overflow of the resin beyond the edges of the layers of the floor element and/or on the coupling elements. For example, the gluing device can be configured to provide the glue at a predetermined distance from said edges. For example, if the gluing device comprises a roller, the roller can comprise a relief having the shape and/or the dimension of the pattern and/or of the layer of the glue and it is adapted to be pressed on the surface of the layer on which the glue shall be provided.

Preferably the resin has a viscosity less than 1000 cP, preferably less than 750 cP, even more preferably, less than 500 cP at 20° C.

The gluing device can comprise a heating element to heat up the glue, or at least one of its components, before providing the glue on the layer. The gluing device can also comprise a pump and/or a valve assembly to control the flow of the glue.

The plant can further comprise a handling device for stacking the decorative layer on the support layer or vice versa. Said handling device can be, for example, a pantograph or an anthropomorphous robot, and be provided with gripping means. The handling device is advantageously provided before the pressing equipment, more preferably between the gluing device and the pressing equipment.

In some embodiments of the invention, the plant can further comprise one or more cleaning devices configured to clean the edges and/or the coupling elements of the layers in order to remove possible residue of glue that overflew beyond the edges of the layers. Said cleaning devices can comprise, for example, brushes configured to brush the edges and/or the coupling elements of the floor element. The cleaning devices are placed at least downstream of the gluing device, more preferably downstream of the pressing equipment, possibly before and after the pressing equipment.

Advantageously, the plant can comprise an optical reader configured to read a mark or sign provided on the support layer and/or on the decorative layer. Said mark or sign can identify one specific edge and/or one specific coupling element of the layers to check if said layer is provided to the pressing equipment with the correct orientation. Identification of the correct orientation of the layers, preferably of at least the lower support layer, is useful for correctly adjusting the relative position between layers in the pressing equipment. The optical reader can be substituted with any equivalent detecting means suitable to detect a mark or sign. Said detecting means can be contactless or with contact. The optical reader, or the detecting means, can be disposed downstream of the pressing equipment, preferably downstream of the gluing line.

Advantageously, the plant comprises a stocking area disposed downstream of the pressing equipment where the floor elements pressed in the pressing equipment can rest during ageing and/or curing of the glue.

In a further independent aspect, the invention relates to a method for manufacturing a floor element comprising the steps of: providing at least a first layer to a pressing equipment; providing a second layer to the pressing equipment; adjusting the position of the first layer in a pressing position at the pressing equipment; adjusting the position of the second layer relative to the first layer; and pressing the first and the second layer together.

The first and the second layer can comprise any of the features described above in relation to the decorative and the support layer.

Preferably said step of providing the first layer and said step of providing the second layer to the pressing equipment are performed simultaneously. For example, the method may further comprise the step of stacking the first layer above the second layer. said step of stacking is performed upstream the pressing equipment and then the method comprises the step of providing the stacked layers to the pressing equipment.

Preferably, during the pressing step it is exerted onto the layers a pressure of at least 350 kg/sqm, more preferably at least 370 kg/sqm. According to a preferred aspect of the invention the during the pressing step, the pressure is kept for a pressing time of more than 1 second, preferably more than 10 seconds, for example 30 seconds.

The method may further comprise the step of applying a glue between the layers. Preferably, the method comprises the step of providing the glue on at least one of the layers before said layer is provided to the pressing equipment. More preferably, the step of providing the resin is performed before said step of stacking the layers. The glue is preferably provided onto layer in an amount greater than 150 g/sqm, more preferably greater than 200 g/sqm, for example 220 g/sqm.

The step of providing a glue can comprise the step of spraying and or roller coating the glue on the layer. The step of providing the glue can comprise the step of mixing the components of the glue. The step of providing the glue can comprise the step of heating the glue or at least one of its components.

The resin can be provided to form a uniform layer or a predetermined pattern. Preferably said coating or pattern is disposed at a predetermined distance from the edges of the layers to prevent the overflow of the glue beyond the edges and/or on the coupling element.

Preferably pressing is performed to spread the glue on the layers to form a uniform intermediate layer between the first and second layer. More preferably, the pressing step is performed so that the glue forms an intermediate layer covers at least 80% of the surface of the layers, preferably of the smaller between the layers. Preferably the pressing is performed so that the intermediate layer covers at between 80 and 95% of the surface of the layer, preferably of the smaller between the layers.

Preferably, the method comprises a step of stocking the floor elements for a stocking time in order to allow the resin to at least partially cure before being, packaged, transported and/or used in a floor covering. Preferably the stocking time is such to allow the resin to be at least 70% cured, preferably 85% cured, more preferably fully cured. For example, said stocking time is at least 0.5 h, preferably more than 1 h, for example 2 h.

The method may further comprise the step of roughing, for example sanding, the surface of the layer adapted to receive the glue. Preferably said step of roughing is performed before said step of providing the glue.

The method may be performed by the plant as described above and in particular by one or more of the devices and/or equipment described in relation to the plant.

Figure 2:
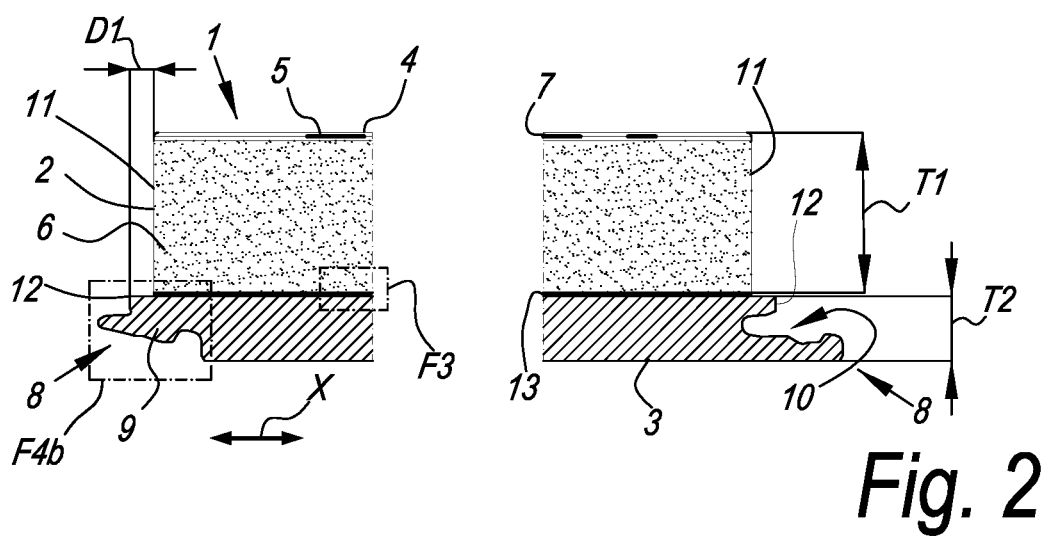
FIG. 2 shows, on a larger scale, a cross-section according to the line II-II indicated in FIG. 1.
Figure 3:
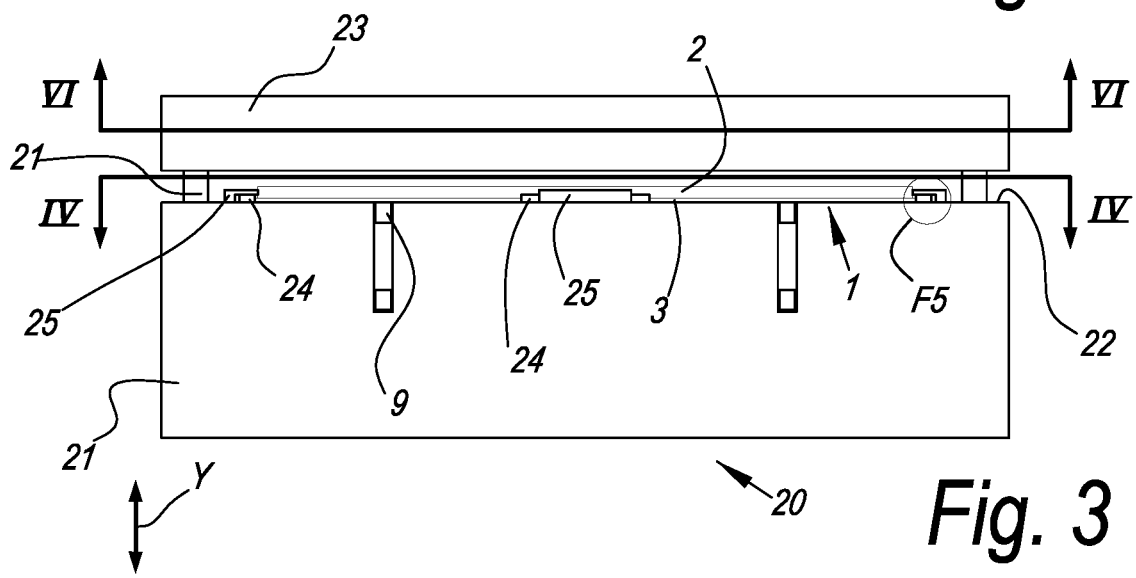
FIG. 3 shows a side view of a pressing equipment according to a first embodiment of the invention.
Figure 5:
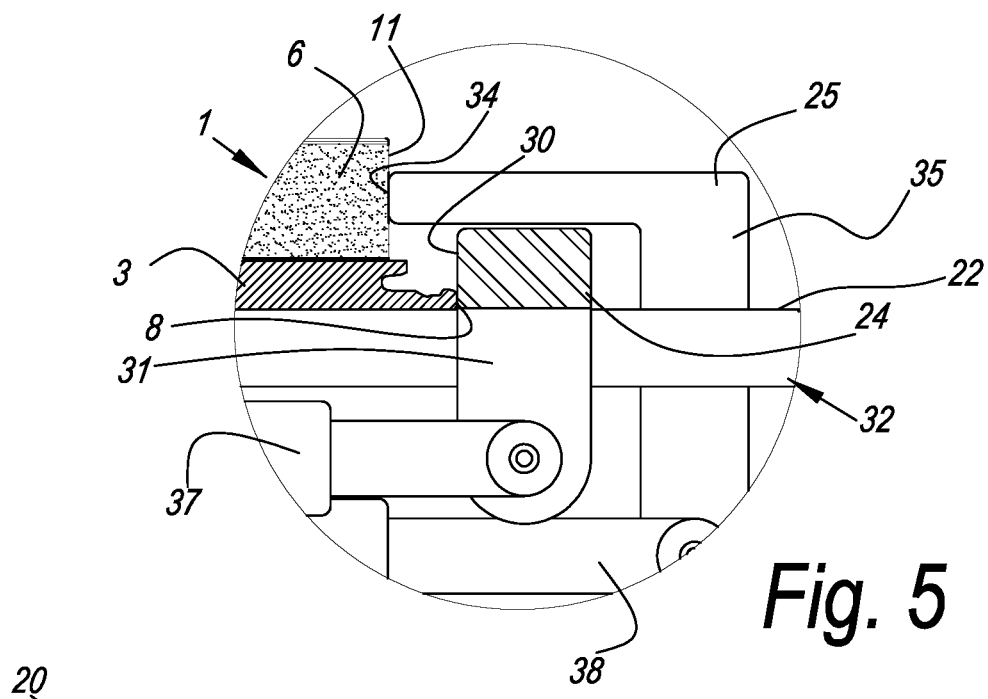
FIG. 5 on a larger scale shows a cross section of the detail V of FIG. 3.
Figure 6:
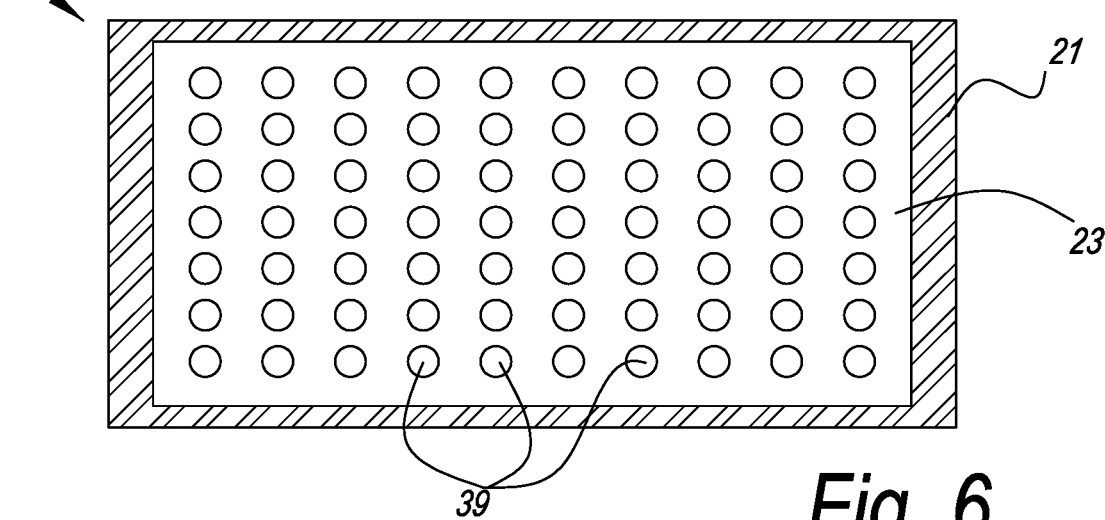
FIG. 6 shows a cross section along line VI-VI of FIG. 3.
Figure 7:
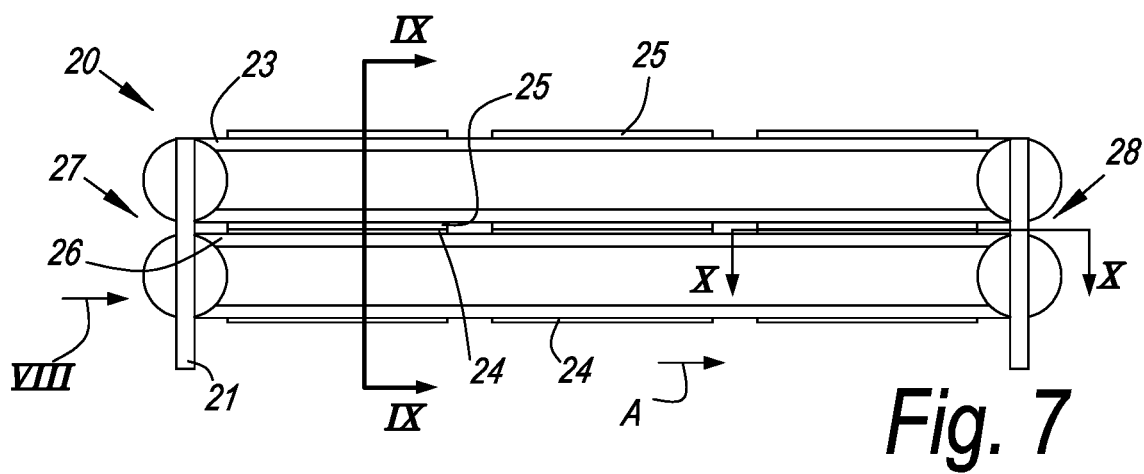
FIG. 7 shows a side view of a pressing equipment according to a second embodiment of the invention.
Figure 8:
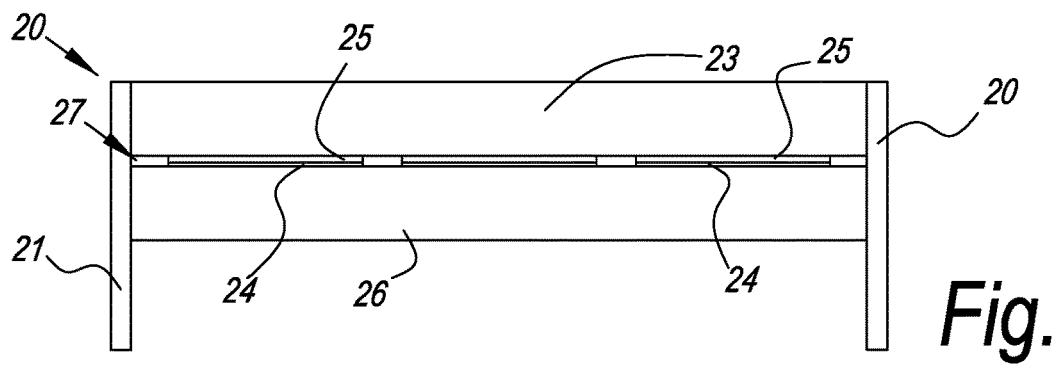
FIG. 8 is a side view along line VIII of FIG. 7.
Figure 9:
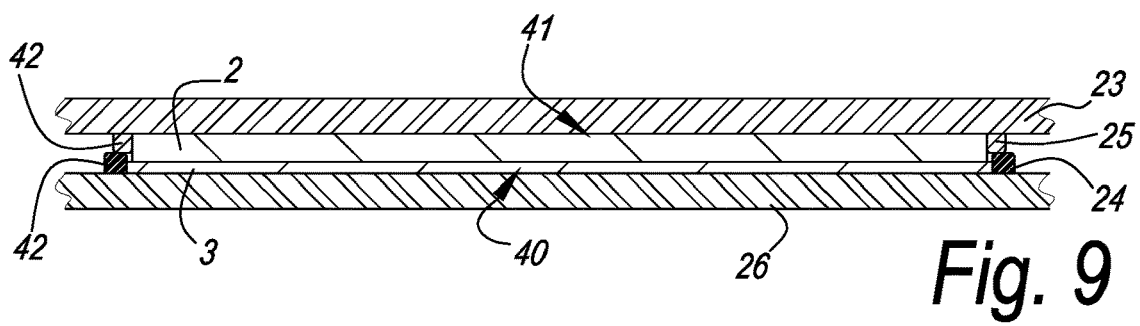
FIG. 9, on a larger scale, shows a detail from the cross section along line IX-IX of FIG. 7 in a first configuration.
Figure 10:
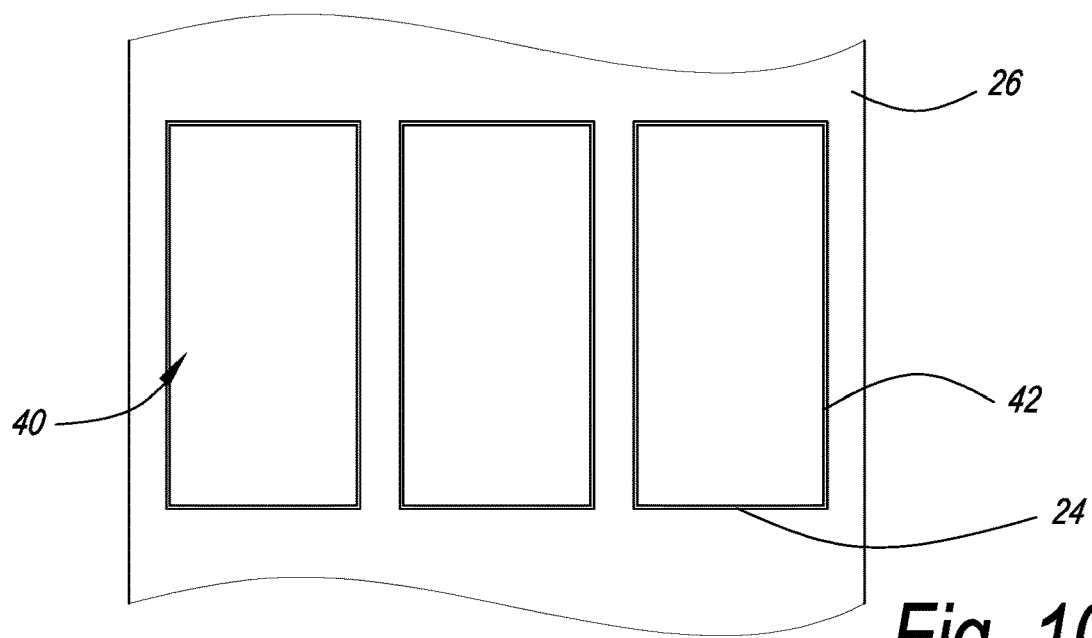
FIG. 10 shows a cross section of FIG. 9.
Figure 11:
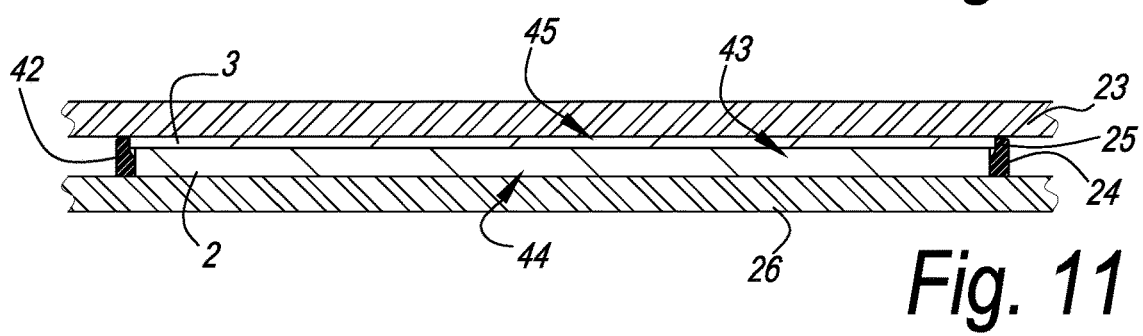
FIG. 11, on a larger scale, shows a detail from the cross section along line IX-IX of FIG. 7 in a second configuration.

With the intention of better showing the characteristics of the invention, in the following, as an example without any limitative character, several preferred forms of embodiments are described with reference to the accompanying drawings, wherein:

FIG. 1 shows a top plane view of a floor element;

FIG. 2 shows, on a larger scale, a cross-section according to the line II-II indicated in FIG. 1;

FIG. 3 shows a side view of a pressing equipment according to a first embodiment of the invention;

FIGS. from 4a to 4c show a cross section along line IV-IV of FIG. 3 wherein the pressing equipment is in different configurations;

FIG. 5 on a larger scale shows a cross section of the detail V of FIG. 3;

FIG. 6 shows a cross section along line VI-VI of FIG. 3;

FIG. 7 shows a side view of a pressing equipment according to a second embodiment of the invention;

FIG. 8 is a side view along line VIII of FIG. 7;

FIG. 9, on a larger scale, shows a detail from the cross section along line IX-IX of FIG. 7 in a first configuration;

FIG. 10 shows a cross section of FIG. 9;

FIG. 11, on a larger scale, shows a detail from the cross section along line IX-IX of FIG. 7 in a second configuration;

FIG. 12 shows in a schematic view a plant for manufacturing a floor element.

FIG. 1 shows a floor panel 1 comprising an upper decorative layer 2 and a lower support layer 3. The floor panel 1 has a rectangular and oblong shape having a longitudinal length L larger than the transversal width W.

The upper decorative layer 2 has an upper face 4 comprising a décor 5. The décor 5 can be provided with a variety of textures, designs and colors. In the illustrated example the décor 5 simulates a wood pattern comprising wood nerves and flakes. Preferably, the décor 5 is realized by means of digital printing, such as inkjet printing, although screen printing, rotogravure, flexography or off-set printing is not excluded.

FIG. 2 on a larger scale shows a cross section along the line II-II of FIG. 1. According to the preferred illustrated example the decorative layer 2 is substantially constituted by a ceramic tile. Said ceramic tile comprises a body 6 made of a ceramic material, for example red body ceramic or porcelain. Said ceramic tile of the decorative layer 2 preferably comprises one or more covering layer 7 covering the upper face of the body 6. Said covering layer 7 preferably comprises at least a glaze that substantially form the upper face 4 of the upper decorative layer 2. The décor 5 is covered by or comprised in said covering layer 7.

FIG. 2 also shows that decorative layer 2 has a thickness T1 comprised between 4 and 15 mm, for example 6 mm, preferably above 7 mm, for example 8 or 10 mm.

Although the ceramic tile constitutes the preferred solution for forming the upper decorative layer 2, the latter can be alternatively formed by natural stone, glass, ceramic glass material, concrete, mineral board or artificial stone.

The lower support layer 3 is preferably made of a polymeric material, preferably a thermoplastic material like PVC. In a preferred embodiment, the board is made of a rigid PVC. Within the context of the present description, "rigid" means that the board, taken alone, bends under the own weight thereof less than 10 cm per meter and still better less than 5 cm per meter. The lower support layer 3 may also comprise a high amount of filler materials, such as chalk, e.g. more than 30 wt % or more than 60% wt of such filler materials. It is also not excluded that the lower support layer 3 may comprises fiber material, like cellulose or wood fiber, or also wood particles material embedded in said polymeric material.

Although polymeric material constitutes the preferred solution for forming the lower support layer 3, the latter can be alternatively formed by cement-based board, mineral-based board or boards made of other materials like metal. Cement can be preferably Portland cement, and cement-based board can comprise fiber cement board, i.e. fiber containing cement boards. Mineral can be preferably magnesium oxide or other metals oxides, and mineral-based board can comprise fiber mineral board, i.e. fiber containing mineral boards.

Furthermore, the lower support layer 3 preferably has a thickness T2 comprised between 2 and 7 mm, preferably less than 6 mm, for example about 4 mm.

FIG. 2 also shows that the lower support layer 3 comprises edges 8 provided with coupling elements 9, 10 configured to realize a mechanical coupling with coupling elements 9, 10 of an adjacent floor element 1. In the illustrated examples the coupling elements 9, 10 comprise a male and female parts disposed on opposite edges 8. The male and female parts are respectively shaped in form of a tongue 9 and a groove 10 wherein the tongue 9 projects outwardly beyond its respective edge 8 in a horizontal direction X and the groove 10 projects inwardly with respect to the respective edge 8 in said horizontal direction X.

The lower support layer 3 extends beyond edges 11 of the upper decorative layer 2. In the example, the lower support layer 3 comprises upper edges 12, at said edges 8, that extend beyond the edges 11 of the upper decorative layer 2 of a distance D1. In the preferred and illustrated example, said distance D1 is equal on all the sides of the floor element 1. In practice, the lower support layer 3 is larger than the upper decorative layer 2.

Although in a preferred example the lower support layer 3 extends beyond all the edges 11 of the upper decorative layer 2, it is not excluded that in an alternative embodiment the lower support layer 3 may extend beyond only some of the edges 11 of the upper decorative layer 2 and that the upper decorative layer 2 extends beyond some of the edges 8 of the lower support layer 3. Moreover, in another alternative embodiment the upper decorative layer 2 may extend beyond all the edges 8 of the lower support layer 3. In a further alternative embodiment, the edges 11 of the upper decorative layer 2 may substantially coincide with the edges 8 of the lower support layer 3.

FIG. 2 further shows that the floor element 1 comprises an intermediate layer 13 disposed between the upper decorative layer 2 and the lower support layer 3. The intermediate layer 13 comprises a resin material, for example a thermosetting resin or thermoplastic resin. Examples of thermosetting resin are epoxy, polyurethane, cyanoacrylate, unsaturated polyester, vinyl ester or acrylic resin. Examples of thermoplastic resin are hot melt, polyester thermoplastic, vinyl etc. Preferably the resin is a rigid resin. In particular, according to a preferred embodiment of the invention the intermediate layer 13 comprises an epoxy resin. It is also preferred that the epoxy is a bicomponent resin, i.e. a thermosetting resin obtained by curing at low temperature (for example at room temperature) a mixture of two components, namely a resin and a hardener. Furthermore, in a preferred embodiment the resin comprises a viscosity in an uncured state less than 1000 Pas at 20° C., and/or permeates a porosity of the upper decorative layer 2, i.e. of the body 6 of the ceramic tile.

It is also to be noted that the floor element may comprise one or more of the features of the floor element described in application U.S. Ser. No. 16/278,560 which is hereby incorporated by reference.

FIG. 3 shows a side view of a pressing equipment 20 for manufacturing the floor element 1 shown in FIGS. 1 and 2. The equipment 20 comprises a supporting structure 21 provided with a supporting plate 22 upon which the floor element 1, preferably at least one layer between the upper decorative layer 2 and the lower support layer 3, rests to be pressed.

The pressing equipment 20 further comprises a press 23 for pressing together the layers 2, 3 of the floor element 1. The press 21 is supported by the supporting structure 21 above said supporting plate 22. The press 23 is able to exert a pressure on the layers 2, 3 of the floor element along a vertical direction Y.

The equipment further comprises a positioning device 24 and a centering device 25 adapted respectively adjust the position of the lower support layer 3 above the supporting plate 22, and to adjust the mutual position of the upper decorative layer 2 and the lower support layer 3 of the floor element 1.

The pressing equipment 20 further comprises a carrier 26 adapted to transport the layers 2,3 to supporting plate 22. Preferably the same transporting device is also adapted to remove the floor element 1 from the supporting plate 22. In the illustrated example the carrier 26 comprises a transporting belt.

Figure 4A:
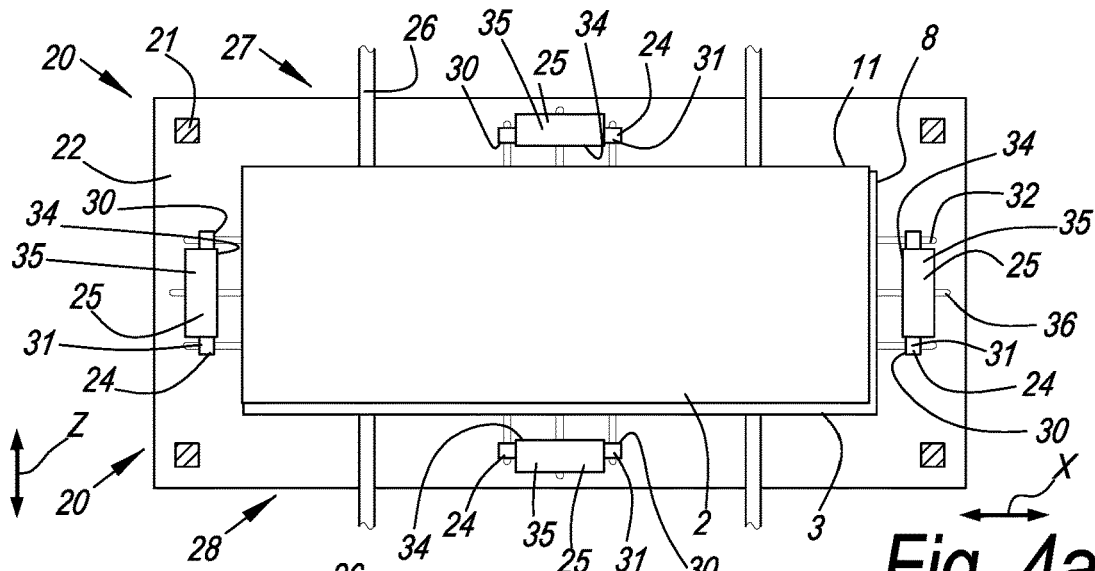
FIGS. 4a to 4c show a cross section along line IV-IV of FIG. 3 wherein the pressing equipment is in different configurations relative to the floor element in FIGS. 4a to 4c.
Figure 4B:
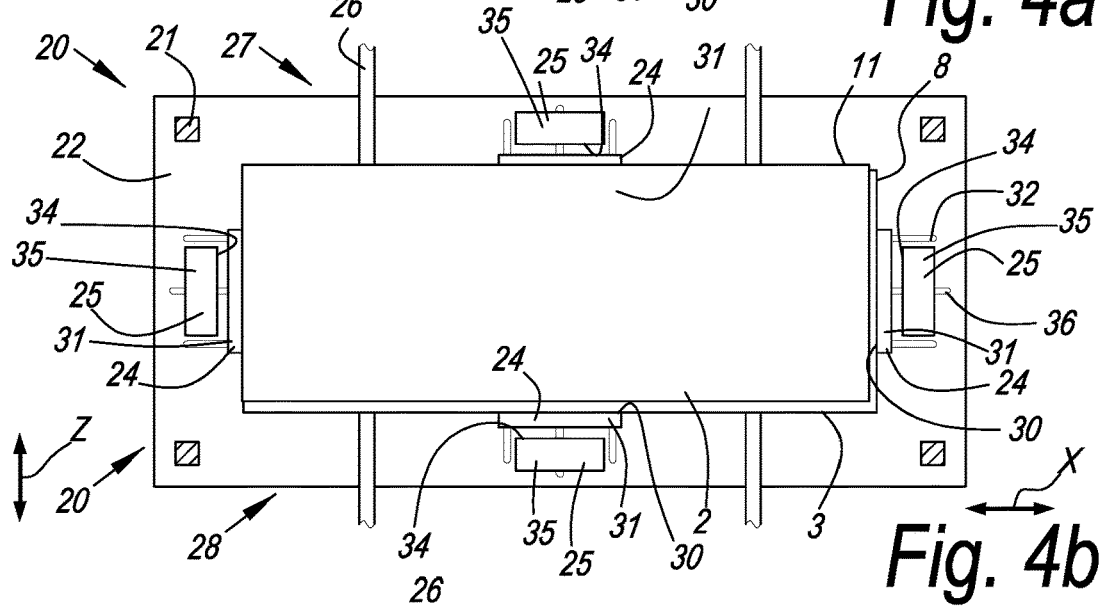
Figure 4C:
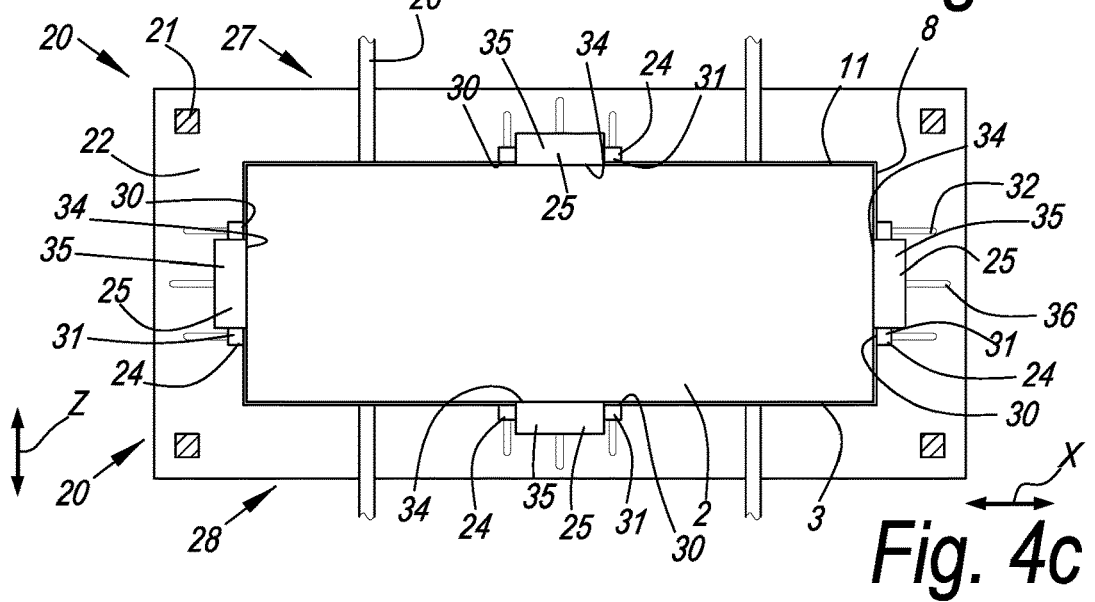

FIGS. 4a to 4c show a cross section along line Iv-Iv of FIG. 3 wherein the pressing equipment is in different configurations. As visible in FIGS. 4a to 4c said carrier 26 crosses the supporting structure 21 so that the layers 2,3 can approach the supporting plate through an inlet opening 27 in the supporting structure 21, and the floor element 1 can leave the supporting plate through an outlet opening 28 on an opposite side of the supporting structure 21.

According to the embodiment shown in FIGS. 4a to 4c, the positioning device 24 comprises two couples 29 of contact surfaces 30, wherein each couple 29 of contact surfaces 30 is adapted to contact opposite edges 8 of lower support layer 3. The first and the second couple 29 of contact surfaces 30 are orthogonal to each other so that the first couple 29 is adapted to interact with the short edges 8 of the lower support layer 3, and the second couple 29 of contact surfaces 30 is adapted to interact with the long edges 8 of the lower support layer 3.

In this embodiment, the positioning device 24 comprises a plurality of movable elements 31 adapted to adjust the distance between the contact surface 30. Each movable element 31 is provided with one contact surface 30 and is configured to approach or move away from said contact surface 30 to the other contact surface 30 of the couple 29, preferably in a horizontal direction X, Z that is substantially orthogonal to the contact surfaces 30.

Preferably, the movable element 31 is movable on a horizontal plane substantially along a straight line. In the illustrated example the movable elements are movable along sliding guides 32. In particular each movable element 31 is movable along a respective sliding guide 32. In the illustrated example, the movable element 31 provided with the contact surfaces 30 of the first couple 29 is movable along a sliding guide 32 that is oriented along a horizontal direction X substantially perpendicular to the short edges 8 of the lower support element 3. Similarly, the movable element 31 provided with the contact surfaces 30 of the second couple 29 is movable along a sliding guide 32 that is oriented along a horizontal direction Z substantially perpendicular to the long edges 8 of the lower support element 3.

In the embodiment shown in FIGS. 4a to 4c, the centering device 25 is adapted to interact only with the upper decorative layer 2. This provides the possibility of adjusting the mutual position of the two layers 2, 3 of the floor element 1 according to the product specification.

The centering device 25 comprises two couples 33 of abutment surfaces 34 adapted to contact opposite edges 11 of the upper decorative layer 2. Advantageously, the first and the second couple 33 of abutment surfaces 34 are transverse to each other, preferably orthogonal to each other. A first couple 33 of abutment surfaces 34 is adapted to interact with the short edges 11 of the upper decorative layer 2 and the second couple 33 of abutment surfaces 34 is adapted to interact with the long edges 11 of the upper decorative layer 2.

In a preferred embodiment the centering device 25 comprises a plurality of movable elements 35 is adapted to adjust the distance between the abutment surfaces 34 of each couple 33 of abutment surfaces 34. Preferably, each movable element 35 is provided with one abutment surface 34 of the couple 33 and is configured to approach or move away from said abutment surface 34 to the other abutment surface 34 of the couple 33, preferably in a direction X, Z that is substantially orthogonal to the abutment surfaces 34.

The movable elements 35 of the centering device 25 are movable on a horizontal plane substantially along a straight line. In the illustrated example the movable elements 35 of the centering device 25 are movable along sliding guides 36. In particular each movable element 35 of the centering device 25 is movable along a respective sliding guide 36. In the illustrated example, the movable element 35 is provided with the abutment surfaces 3a of the first couple 33 is movable along a sliding guide 36 that is oriented along a horizontal direction X substantially perpendicular to the short edges 11 of the upper decorative layer 2. Similarly, the movable element 35 provided with the abutment surfaces 34 of the second couple 33 is movable along a sliding guide 36 that is oriented along a horizontal direction Z substantially perpendicular to the long edges 11 of the upper decorative layer 2.

As it visible from FIGS. 4a, 4b and 4c, the centering device 25 is disposed above the positioning device 24. In a preferred embodiment, the centering device 25 is independent from the positioning device 24. In particular, the centering device 25 is movable independently with respect to the movement of the positioning device 24.

FIG. 4a shows the pressing equipment 20 in a first configuration wherein the layers 2, 3 for forming the floor element 1 are placed on the supporting plate 22 and wherein the positioning device 24 and the centering device 25 are not interacting with the layers 2, 3. Therefore in this configuration the layers 2, 3 of the floor element 1 are not yet in the pressing position, and the mutual position between the layers is not yet adjusted. In this first configuration, the movable elements 31 of the positioning device 24 are in a retracted position wherein the mutual distance between the contact surface 30 of each couple 29 of contact surfaces 30 is at its maximum and/or, more generally, is larger than the correspondent dimension W, L of the support layer 2. Similarly, the movable elements 35 of the centering device 25 are in a retracted position wherein the mutual distance between the abutment surface 34 of each couple 33 of abutment surfaces 34 is at its maximum and/or, more generally, is larger than the correspondent dimension of the upper decorative layer 3.

FIG. 4b shows the pressing equipment 20 in a second configuration wherein the layers 2, 3 for forming the floor element 1 are placed on the supporting plate 22, wherein the positioning device 24 is interacting with the lower support layer 2 to place it in the pressing position, and wherein the centering device 25 is not interacting with the upper decorative layer 3. In this second configuration, the movable elements 31 of the positioning device 24 are in an operative position wherein the mutual distance between the contact surface 30 of each couple 29 of contact surfaces 30 is at its minimum and/or, more generally, is substantially equal to the correspondent dimension L, W of the support layer 2. In this operative position each contact surface 30 of the positioning device 24 contacts a respective edge 8 of the lower support layer 2. Moreover, in this second configuration, the movable elements 35 of the centering device 25 are in a retracted position wherein the mutual distance between the abutment surface 34 of each couple 33 of abutment surfaces 34 is at its maximum and/or, more generally, is larger than the correspondent dimension of the upper decorative layer 3. For example, the centering device 25 is in the same configuration shown in FIG. 4a.

FIG. 4c shows the pressing equipment 20 in a third configuration wherein the layers 2,3 for forming the floor element 1 are placed on the supporting plate 22 and wherein the positioning device 24 and the centering device 25 are interacting with the layers 2, 3. In this third configuration, the movable elements 31 of the positioning device 24 are in an operative position wherein the mutual distance between the contact surfaces 30 of each couple 29 of contact surfaces 30 is at its minimum and/or, more generally, is substantially equal to the correspondent dimension L, W of the support layer 2. Moreover, in this operative position each contact surface 26 of the positioning device 24 contacts a respective edge 8 of the lower support layer 2 to keep it in the pressing position. Similarly, the movable elements 35 of the centering device 25 are in an operative position wherein the mutual distance between the abutment surfaces 34 of each couple 33 of abutment surfaces 34 is at its minimum and/or, more generally, is substantially equal to the correspondent dimension of the upper decorative layer 2. In this operative position each abutment surface 34 of the centering device 25 contacts a respective edge 11 of the upper decorative layer 2.

FIG. 5 on a larger scale shows a cross section of the detail V of FIG. 3. As visible from FIG. 5 the positioning device 24 comprises an actuator 31 configured to move the movable elements 30 between the retracted and the operative position. In the illustrated embodiment, the centering device comprises one actuator for each movable element. In alternative embodiments, the actuator can be configured to move a plurality of, preferably all of, the movable elements of the positioning device. In the illustrated example, the actuator comprises a linear actuator, for example a piston having the stem connected to a lower portion of the movable element and the cylinder connected to the supporting structure.

Moreover, FIG. 5 shows that the centering device 25 comprises an actuator 37 configured to move the movable elements 35 between the retracted and the operative position. In the illustrated embodiment, the centering device 25 comprises one actuator 37 for each movable element 35. Therefore, in the illustrated embodiment, each movable element 35 may be moved independently from the others. Anyway, it is not excluded that in alternative embodiments, the actuator 37 can be configured to move a plurality of, preferably all of, the movable elements 35 of the centering device. In the illustrated example, the actuator 37 is a linear actuator, for example a piston having the stem connected to a lower portion of the movable element and the cylinder connected to the supporting structure 21.

FIG. 5 also shows that the positioning device 24 comprises an actuator 38 configured to move the movable elements 31 between the retracted and the operative position. In the illustrated embodiment, the positioning device 24 comprises one actuator 38 for each movable element 31. Therefore, in the illustrated embodiment, each movable element 31 may be moved independently from the others. In alternative embodiments, the actuator 38 can be configured to move a plurality of, preferably all of, the movable elements 34 of the positioning. In the illustrated example, the actuator 38 is a linear actuator, for example a piston having the stem connected to a lower portion of the movable element and the cylinder connected to the supporting structure 21.

In alternative embodiments, one actuator is able to move both the movable element 31 of the positioning device 24 and the movable element 35 of the centering device 25.

FIG. 6 shows a cross section along line VI-VI of FIG. 3 illustrating the press 23. In the illustrated embodiment the press 23 is a stationary press 23. As visible from FIG. 6 the press 23 comprises a plurality of pressing element 39. In the illustrated example the pressing element 39 are pistons activated by a pneumatic, oleo dynamic, mechanical and/or hydraulic force. Said pressing elements are adapted to press directly the floor element 1. In the illustrated embodiment each pressing element 39 comprises a cylinder 40 fixed to the supporting structure and a retractable stem 41 having an extremal portion adapted to press on the floor element, for example on the upper surface 4 of the decorative layer 2.

Preferably, the pressing elements 39 are independently controllable and/or controllable in group of pressing elements 39, so that they can be controlled and/or activated according to the product specification. For example, for manufacturing a larger floor element 1 a larger number of pressing elements 39 can be activated whereas for manufacturing a smaller floor element 1 a lower number of pressing elements 39 can be activated.

Preferably, the press 23 is configured to exert a pressure of at least 350 kg/sqm on the floor element 1. Preferably, the press is configured to exert a pressure of less than 500 kg/sqm on the floor element. Preferably, the press is configured to keep the pressure exerted on the floor element for a pressing time of at least 1 s.

FIGS. 7 to 10 show the pressing equipment 20 according to a second embodiment of the invention wherein the press 23 is a continuous pressing device, where the floor element 1 advances in a predetermined advancing direction A during the pressing operation. In other words, the pressing position is movable with respect to the supporting structure 21. In this second possibility the pressing equipment 20 comprises a carrier 26, preferably a belt, adapted to move the floor element 1 along advancing direction A. In this embodiment the carrier 26 preferably, although not necessarily, substitutes the supporting plate 22 of the first embodiment. Preferably, as visible from FIG. 7, the press 23 comprises a pressing belt.

In the embodiment shown in FIGS. 7 and 8 the centering device 25 is fixed in a predetermined position with respect to the belt of the press 23. Moreover, the positioning device 24 is fixed in a predetermined position with respect to the carrier 26. Therefore, the positioning device 24 and the centering device 25 are movable along the advancing direction A.

As visible from FIGS. 9 and 10 the positioning device 24 is substantially formed by a containing cavity 40 provided on the carrier 26, and the centering device 25 is substantially formed by a containing cavity 41 provided on the press 23. Said containing cavity 40 of the positioning device 24 is defined by walls on which said contact surfaces 30 are provided. Similarly, the containing cavity 41 of the centering device 25 is defined by walls on which said abutment surfaces 34 are provided. In the illustrated example the walls of the cavities 40, 41 defining the positioning device 24 and the centering device are formed by ribs 42 rising from a surface of the carrier 26 and of the pressing belt 23. Preferably said ribs 42 are made of polymeric material, preferably of a compressible material.

FIG. 11 shows a variant of the second embodiment wherein the centering device 25 and the positioning device 24 are formed in one piece by the same containing cavity 43. In this embodiment, the walls defining the containing cavity 43 are shaped in such a way to define a lower narrow portion 44 of the cavity 43, for example suitable to contain the upper decorative layer 2, and an upper larger portion 45 of the cavity 43, for example suitable to contain the lower support layer 3. In this embodiment, the floor element 1 is for example pressed upside down. In the illustrated example the walls of the cavity 43 are formed by ribs 42 rising from a surface of the carrier 26. Preferably said ribs 42 are made of polymeric material, preferably of a compressible material.

FIG. 12 shows in a schematic view a plant 50, or a manufacturing line, for manufacturing a floor element 1. The plant 50 comprises one or more carriers 55 that transport the layers 2,3 of the floor element 1 through the plant 50 itself along an advancing direction A. This carrier 55 can coincide with the carrier 26 of the pressing equipment 20 or can be separated to the carrier 26 of the pressing equipment 20.

The plant 50 can comprise an optical reader 57 configured to read a mark or sign provided on the support layer 3. Said mark or sign can identify one specific edge 8 and/or one specific coupling element 9,10 of the lower support layer to check if the lower support layer is provided with the correct orientation. Identification of the correct orientation of the support layer 3 is useful for correctly adjusting the relative position between the lower support layer 3 and the upper decorative layer. The optical reader 57 can be substituted with any equivalent detecting means suitable to detect a mark or sign.

The plant 50, illustrated in the example, comprises a gluing device 51 configured to provide a glue on the top surface lower support layer 3 on the carrier 55, thereby performing a step S1 of providing said glue in a method for manufacturing a floor element 1. The gluing device 51 comprises a sprayer having one or more nozzles for spraying the glue on said top surface. It is not excluded that in alternative embodiments the gluing device 51 comprises roller or other coating or gluing means. The gluing device 51 is configured to provide the glue in a pattern, but in alternative embodiment the gluing device 51 is configured to provide the glue as a uniform coating on the top surface of the lower support layer 3.

The plant 50 further comprises a handling device 53, disposed downstream the gluing device 51, configured to stack the lower support layer 3 and the upper decorative layer 2 one upon the other in a stacking step S2 of the method. For example, the handling device 53 comprises a pantograph 54, provided with gripping means to grab the decorative layer 2 and place it above the support layer 3 thereby stacking the two layers. In this stage the lower support layer 3 and the upper decorative layer 2 are not yet bonded to each other and the mutual position can be adjusted in the pressing equipment 20. This handling device is completely optional and the two layer 2,3 can be stacked directly in the pressing equipment 20.

Downstream of the handling device 53 is disposed the pressing equipment 20 that in the preferred embodiment is the stationary press described above in FIGS. from 3 to 6. In the example the stacked layers 2,3 for forming the floor element 1 are provided to the pressing position at the pressing equipment 20. The positioning device 24 adjust the position of the lower support layer 3 on the pressing position at the pressing equipment 20. The centering device 25 then adjusts the position of the decorative layer 2 on the lower support layer 3. The positioning device 24 and the centering device 25 keep the position of the layers during a pressing step S3.

It is to be noted that the plant 50 can comprise a plurality of pressing equipment 20.

The plant 50 further can comprise a cleaning device 56, for example a brusher, configured to clean glue residues that eventually overflew beyond the edges of the layers 2, 3 on the coupling elements. the cleaning device 56 is preferably disposed downstream of the pressing equipment 20 in a cleaning step S4.

The plant 50 further can comprise a stocking area 52 disposed downstream of the pressing equipment 20 where the floor elements 1 pressed in the pressing equipment 20 can rest during ageing and/or curing of the glue, before they are subjected to further processing steps like quality control check and packaging in a stocking step S5.

The present invention is in no way limited to the hereinabove described embodiments, but such equipment and/or plant may be realized according to different embodiments without leaving the scope of the present invention.

Further, as is clear from the content of the description, the present invention relates to one or more of the items as listed below, numbered from 1 to 48:

1.—A pressing equipment for manufacturing a floor element, wherein the floor element comprises an upper decorative layer and a lower support layer, wherein the equipment comprises: a press for pressing the upper decorative layer upon the lower support layer, a positioning device for placing the floor element in a pressing position at the pressing element, and a centering device for adjusting the mutual position of the upper decorative layer and of the lower support layer.

2.—Pressing equipment according to item 1, wherein at least one between the upper layer and the lower support layer comprises edges extending beyond an upper edge and/or a lower edge of the other layer.

3.—Pressing equipment according to any of the preceding items, wherein the positioning device is adapted to interact with at one or more layer selected between the lower support layer and the upper decorative layer.

5.—Pressing equipment according to any of the preceding items, wherein the positioning device is adapted to interact with one or more edges of a layer to be positioned.

6.—Pressing equipment according to any of the preceding items, wherein the positioning device comprises at least a first couple of contact surfaces adapted to contact opposite edges of the layer to be positioned in the pressing position.

7.—Pressing equipment according to item 6, wherein the positioning device is provided with a second couple of contact surfaces adapted to contact opposite edges the layer to be positioned, advantageously the first and the second couple of contact surfaces are transversal each other, preferably orthogonal each other.

8.—Pressing equipment according to item 6 or 7, wherein the positioning device comprises at least one movable element adapted to adjust the distance between the contact surface of the couple of contact surfaces.

9.—Pressing equipment according to item 8, wherein said movable element is provided with one contact surface of the couple and is configured to approach/or move away said contact surface to the other contact surface of the couple, preferably in a direction that is substantially orthogonal to the contact surfaces.

10.—Pressing equipment according to any of the items from 8 to 9, wherein the positioning device comprises at least one movable element for each couple of contact surfaces.

11.—Pressing equipment according to any of the items from 8 to 10, wherein the positioning device comprises one movable element for each surface of the couple of surfaces so that the surfaces of the couple can be reciprocally approached and/or moved away.

12.—Pressing equipment according to any of the items from 10 or 11, wherein the movable elements of each couple of contact surfaces may be moved synchronously.

13.—Pressing equipment according to any of the items from 10 or 11, wherein each movable element may be moved independently from the others.

14.—Pressing equipment according to any of the items from 8 or 13, wherein the positioning device can comprise an actuator configured to move the movable element, preferably one actuator for moving a plurality of, or advantageously all of, the movable elements related to each couple of contact surfaces.

15.—Pressing equipment according to any of the preceding items, wherein the centering device is preferably adapted to interact with only one layer selected between the support layer and the ceramic layer, preferably, the centering device is adapted to interact with that layer of the floor element that does not interact with the positioning device.

16.—Pressing equipment according to any of the preceding items, wherein the centering device is adapted to interact with one or more edges of said layer to be centered.

17.—Pressing equipment according to any of the preceding items, wherein the centering device comprises at least a first couple of abutment surfaces adapted to contact opposite edges of the layer to be centered.

18.—Pressing equipment according to item 17, wherein the centering device is provided with a second couple of abutment surfaces adapted to contact opposite edges the layer to be positioned.

19.—Pressing equipment according to item 17 or 18, wherein the centering device comprises at least one movable element adapted to adjust the distance between the abutment surfaces of the couple of abutment surfaces.

20.—Pressing equipment according to item 19, wherein said movable element is provided with one abutment surface of the couple and is configured to approach or move away from said contact surface to the other abutment surface of the couple, preferably in a direction that is substantially orthogonal to the abutment surfaces, advantageously, the centering device comprises one movable element for each couple of abutment surfaces.

21.—Pressing equipment according to item 20, wherein the centering device comprises one movable element for each abutment surface of the couple of abutment surfaces so that the abutment surfaces of the couple can be reciprocally approached and/or moved away.

22.—Pressing equipment according to item 21, wherein the movable elements of each couple of contact surfaces may be moved synchronously.

23.—Pressing equipment according to item 22, wherein the positioning device can comprise one actuator for moving a plurality of, preferably all of, the movable elements related to each couple of contact surfaces.

24.—Pressing equipment according to item 21, wherein each movable element may be moved independently from the others.

25.—Pressing equipment according to any of the items from 21 to 24, wherein the movable elements of the centering device are movable independently with respect to the movable elements of the positioning device.

26.—Pressing equipment according to any of the items from 21 to 24, wherein the centering device is solidly linked to the positioning device, at least during the movement of the positioning device.

27.—Pressing equipment according to any of the preceding items, comprising a supporting structure provided with a supporting plate upon which the floor element, preferably at least one layer between the upper decorative layer and the lower support layer, rests to be pressed.

28.—Pressing equipment according to any of the preceding items, wherein the press comprises one or more pressing elements activated by a pneumatic, oleo dynamic, mechanical and/or hydraulic force.

29.—Pressing equipment according to any of the preceding items, wherein the press comprises a plurality of pressing element, and wherein the pressing elements are independently controllable and/or controllable in group of pressing elements.

30.—Pressing equipment according to any of the preceding items, wherein the press is configured to exert on the floor element a pressure of at least 350 kg/sqm, and/or the press is configured to exert on the floor element a pressure of less than 500 kg/sqm.

31.—Pressing equipment according to any of the preceding items, wherein the press is a stationary pressing device.

32.—Pressing equipment according to any of the items from 1 to 30, wherein the press is a continuous pressing device, for example wherein the press comprises a carrier, preferably a belt, adapted to move the floor element along advancing direction during pressing.

33.—Pressing equipment according to item 32, wherein the press comprises at least a pressing belt and/or at least a pressing roller.

34.—Pressing equipment according to item 32 or 33, wherein one or both of the positioning device and/or the centering device is fixed in a predetermined position with respect to the press and/or the carrier.

35.—Pressing equipment according to any item from 32 to 34, wherein one or both of the positioning device and/or the centering device is movable along the advancing direction together with the press and/or the carrier.

36.—Pressing equipment according to item 35, wherein the positioning device is fixed to the carrier and the centering device is fixed to the press, preferably to the belt.

37.—Pressing equipment according to any of the items 35 or 36, wherein one or both of the positioning device and/or the centering device may be substantially formed by a containing cavity provided on the press and/or on the carrier, said containing cavity is defined by walls on which said abutment surfaces and/or contact surfaces are provided.

38.—Pressing equipment according to item 37, wherein said cavity is provided in form of excavations or impressions made in a surface of the carrier and/or of the pressing belt.

39.—Pressing equipment according to item 37, wherein the cavity is defined by ribs rising from a surface of one or both of the carrier and/or of the pressing belt, preferably said ribs are made of polymeric material, preferably of a compressible material.

40.—Pressing equipment according to any of the items 32 or 33, wherein said movable elements are at least movable in a direction transversal, preferably substantially perpendicular to the advancing direction of the floor element.

41.—Pressing equipment according to item 40, wherein one or both of the positioning device and/or the centering device is independent with respect to the movement of the press and of the carrier, that is to say that the positioning device and/or the centering device does not move along the advancing direction.

42.—Pressing equipment according any of the preceding items, comprising one or more carrier adapted to transport one or more of the layers of the floor element toward the pressing position and/or transport the floor element away from the pressing position.

43.—A pressing equipment for manufacturing a floor element, wherein the floor element comprises an upper decorative layer and a lower support layer, wherein the equipment comprises: a press, a carrier to move the floor element along an advancing direction during pressing and at least a centering element to keep the mutual position between the upper ceramic element and a lower support element during pressing.

44.—Pressing equipment according to item 43, and according to any of the items from 32 to 42.

45.—A plant for manufacturing a floor element, the plant comprising a pressing equipment for pressing together the upper decorative layer and the lower support layer, the plant further comprises a gluing device configured to provide a glue on a surface of the decorative layer and/or the lower support layer, said gluing device being disposed upstream to said press.

46.—Plant according to item 45 wherein the pressing equipment is according to any of the items from 1 to 44.

47.—Plant according to item 45 or 46, wherein the gluing device comprises a sprayer to spray or to eject the glue from a nozzle, or comprises a roller or a veil applicator or a bell applicator.

48.—Plant according to any item from 45 or 47, wherein the plant comprises a stocking area disposed downstream the pressing equipment where the floor elements pressed in the pressing equipment can rest during ageing and/or curing of the glue.

What is claimed is:

1. A pressing equipment for manufacturing a floor element comprising:
a pressing device configured to press an upper decorative layer of the floor element upon a lower support layer of the floor element;
a positioning device configured to move in order to place one of the lower support layer and the upper decorative layer in a pressing position on the pressing device, the positioning device comprising a first couple of contact surfaces adapted to contact a first set of opposite edges of the one of the lower support layer and the upper decorative layer and a second couple of contact surfaces adapted to contact a second set of opposite edges of the one of the lower support layer and the upper decorative layer, the first couple of contact surfaces and the second couple of contact surfaces being orthogonal to each other; and
a centering device configured to adjust the position of the other of the upper decorative layer and the lower support layer and to be independently moveable relative to the movement of the positioning device, the centering device comprising at least a first couple of abutment surfaces adapted to contact opposite edges of the other of the upper decorative layer and the lower support layer.

2. The pressing equipment according to claim 1, wherein the positioning device comprises at least one movable element configured to adjust the distance between the first couple of contact surfaces.

3. The pressing equipment according to claim 2, wherein the positioning device comprises one movable element for each of the first couple of contact surfaces.

4. The pressing equipment according to claim 3, wherein the movable elements for the first couple of contact surfaces are moved synchronously.

5. The pressing equipment according to claim 1, wherein the centering device comprises at least one movable element configured to adjust the distance between the first couple of abutment surfaces.

6. The pressing equipment according to claim 5, wherein the centering device comprises one movable element for each of the first couple of abutment surfaces.

7. The pressing equipment according to claim 6, wherein the movable elements for the first couple of abutment surfaces are moved synchronously.

8. The pressing equipment according to claim 5, wherein the at least one movable element for the centering device is independently movable with respect to movable elements for the positioning device.

9. The pressing equipment according to claim 1 further comprising a supporting structure comprising a supporting plate configured to support the floor element during pressing.

10. The pressing equipment according to claim 1, wherein the pressing device comprises a plurality of pressing elements, and wherein the pressing elements are independently controllable and/or controllable in a group of pressing elements.

11. The pressing equipment according to claim 1, wherein the pressing device is configured to exert a pressure of 350 kg/sqm to 500 kg/sqm on the floor element.

12. The pressing equipment according to claim 1, wherein the pressing device is a stationary pressing device.

13. A plant for manufacturing a floor element comprising:
the pressing equipment according to claim 1; and
a gluing device configured to provide a glue on a surface of one or both of the upper decorative layer and the lower support layer,
wherein the gluing device is upstream of the pressing equipment.

* * * * *